July 30, 1963 H. HENKER 3,099,550

PURIFYING CRYSTALLIZABLE SEMICONDUCTOR MATERIALS BY ZONE MELTING

Filed Feb. 23, 1960 3 Sheets-Sheet 1

July 30, 1963 H. HENKER 3,099,550

PURIFYING CRYSTALLIZABLE SEMICONDUCTOR MATERIALS BY ZONE MELTING

Filed Feb. 23, 1960 3 Sheets-Sheet 2

July 30, 1963 H. HENKER 3,099,550

PURIFYING CRYSTALLIZABLE SEMICONDUCTOR MATERIALS BY ZONE MELTING

Filed Feb. 23, 1960 3 Sheets-Sheet 3

3,099,550
PURIFYING CRYSTALLIZABLE SEMICONDUCTOR MATERIALS BY ZONE MELTING

Heinz Henker, Munich, Germany, assignor to Siemens & Halske Aktiengesellschaft, Berlin and Munich, a corporation of Germany Filed Feb. 23, 1960, Ser. No. 10,256
Claims priority, application Germany Feb. 27, 1959
13 Claims. (Cl. 75—10)

This invention relates to the production of crystallizable semiconductor materials and is particularly concerned with a method of and apparatus for purifying crystallizable semiconductor materials by zone melting.

Technical details and the mode of operation of zone melting, especially the purification effect thereof, are well known in the semiconductor technique. The purification effect is obtained by drawing a molten zone progressively through semiconductor material to be purified, for example, from one to the other end of a semiconductor rod, such molten zone collecting contaminations, based upon different solubility thereof as referred to the solid and fluid phase, and thereby transporting the greater part of the contaminations to one end of the rod where they can be removed by cutting off such end so as to separate the contaminations from the purified material.

Figure 1:
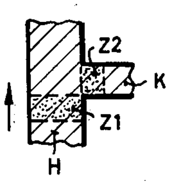
Figure 2:
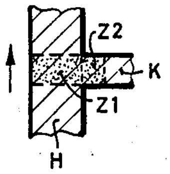
Figure 3:
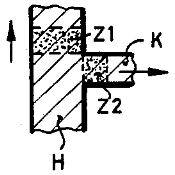
Figure 4:
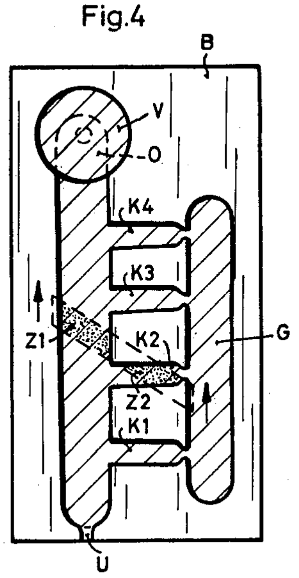
Figure 6:
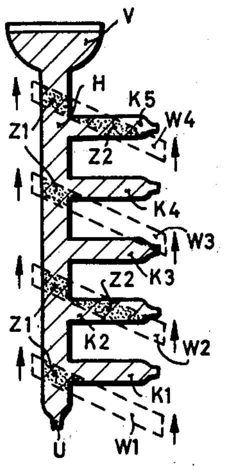
Figure 5:
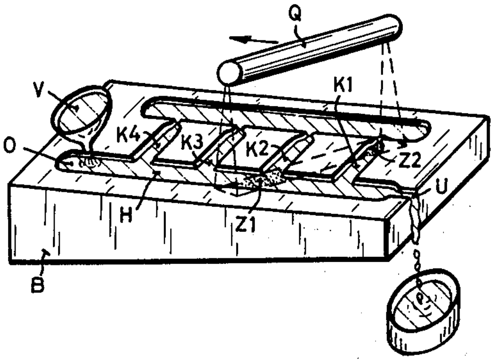
Figure 7:
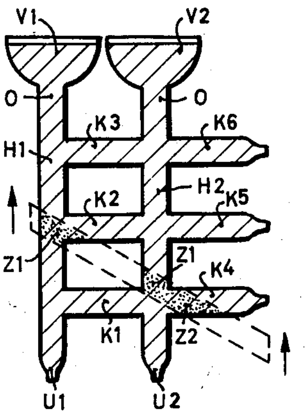

The various objects and features of the invention will appear from the description which is rendered below with reference to the accompanying drawings. In the drawings, FIGS. 1, 2 and 3 show a simple example to illustrate the inventive thoughts;

FIGS. 4 and 5 illustrate the manner of carrying out the method according to the invention, FIG. 4 showing an elevational view and FIG. 5 a perspective view of an example of the apparatus;

FIG. 6 indicates operation with a plurality of molten zone pairs;

FIG. 7 shows an arrangement employing a plurality of serially related melting vessels; and FIGS. 8 to 11 show further embodiments of apparatus for practicing the method according to the invention.

The invention is concerned with a method of purifying crystallizable materials, particularly germanium or other semiconductors, by zone melting, employing a vessel containing the material which is to be purified. The method comprises drawing at least two melting zones through material contained in an elongated conduit-like or tubular melting vessel provided with at least one branch channel, one of said melting zones (Z1) moving through the material contained in the principal conduit of the melting vessel and, upon arriving at the branching-off area, giving off part of the contaminations transported thereby, to a second auxiliary melting zone (Z2)' which is drawn through the material contained in the branch channel and leaves the branching-off area, for example, simultaneously with the melting zone moving in the main conduit.

The inventive thoughts shall now be explained with reference to a particularly simple example illustrated in FIGS. 1 to 3.

In FIGS. 1 to 3, Z1 is the molten zone produced in the main or principal conduit H, and Z2 indicates the molten zone produced in the branch channel K. The two zones Z1 and Z2 are produced by independent heat sources one of which is moved parallel to the main conduit H while the other is moved parallel to the branch channel K. It shall first be assumed that the molten zone Z2 is held at the place where it is produced and that the zone Z1 moves upwardly in the direction of the arrow through the material contained in the main conduit H. While the zone Z1 moves past the branch area (FIG. 2) it forms with the zone Z2 a continuous fluid or liquid mass which is in the phase shown in FIG. 3 again separated to form the zones Z1 and Z2.

If the vessel is at the start of the operation filled with a uniformly contaminated material and if $\rho_0$ is the concentration of contaminations in the material, the concentration of contaminations in the molten zone Z2 will be $\rho_0$, that is, the total content of the dissolved contaminations $\rho_0 \cdot V2$, wherein V2 is the volume of Z2. The molten zone Z1, before it reaches the branching-off point, has collected contaminations, so that its contamination corresponds to a higher concentration $\rho_1 > \rho_0$. The contamination of both zones then results in a concentration (V1=volume of the molten zone Z1)

$$\bar{\rho} = \frac{\rho_1 \cdot V1 + \rho_0 V2}{V1 + V2}$$

so that the concentration $\bar{\rho}$ of contaminations of the two combined or united zones has dropped below the amount which applies to the zone Z1. The material in back of the zone Z1 will separate with a higher degree of purity than it would have in the absence of the molten zone Z2.

If the molten zone ZI accumulates further contaminations on its way from the position shown in FIG. 1 to the position shown in FIG. 3, which are, however, due to the presence of zones Z2 distributed over a large volume, the contamination concentration $\rho_1$ of the molten zone Z1, at the instant of the position of the zones Z1 and Z2 as illustrated in FIG. 3, will be lower than it would have been in the absence of the second zone Z2. This effect is the greater the larger Z2 is as compared with Z1.

If the zone Z2 is now drawn through the branch channel K from the position shown in FIG. 3, to the right, in the direction of the arrow, it will contain a higher contamination concentration than it would have contained in the absence of zone Z1. However, the contamination concentration of the material crystallizing in back of the melting zone Z2 cannot be greater than the contamination concentration of the material in back of the zone Z1 in the adjacent main conduit. The excess of contamination of the melting zone Z2 as compared with the contamination concentration of the material newly melted at the front of this zone Z2 constitutes a measure for the degree in which contaminations are carried from the zone Z1 by the zone Z2 and thus separated from the material in the main conduit or branch H. If care is in addition taken that the ratio of the cross section F2 (more accurately the recrystallization front) to the volume V2 of the molten zone Z2 is, at least so long as Z2 is positioned near the branching area, greater than the corresponding ratio in the case of zone Z1, there will be assurance that the contamination concentration in the crystallized material rises in the neighborhood of the branching area slower than in back of zone Z1, so that particular efficiency can be expected incident to repeating the operation. Whether or not the contaminations dam up in a more remote part of the channel K is at least at the beginning of the operation immaterial, since the contaminated matter in the channel K is separated from the matter in the main conduit H.

It is moreover immaterial for the purification effect whether the molten zone Z2 dwells at the branching-off area longer than the molten zone Z1 or whether both zones leave the branching-off area simultaneously as will be described presently in connection with an embodiment of the invention in which both molten zones are produced by a single heat source. Care must be taken in such case to actually effect a compensation or equalization of the concentration and it may therefore be advisable to cause the molten zones Z1, Z2 to dwell for some time at the branching-off area or to stir such zones.

It is advantageous, but not absolutely necessary, that both melting zones Z1 and Z2 are brought in mutual physical contact. Thus, the zone Z2, if care is taken that it extends into the material in the main conduit, can be caused to leave the branching-off area before the appearance of the molten zone Z1. Since the zone Z2 has collected part of the contaminations in the path of the molten zone Z1, part of the contaminations in the main conduit had been given off to the molten zone Z2 moving in the branch channel and such contaminations therefore cannot contribute toward the contamination concentration in the melting zone Z1.

The manner in which the method according to the invention can be particularly advantageously practiced will now be explained with reference to FIGS. 4 and 5, FIG. 4 showing an elevational view and FIG. 5 a perspective view of suitable apparatus which is in known manner arranged in a high vacuum or an inert gas.

The energy source or heat source Q, which will be presently described more in detail, and which may be a line-like radiation source, is shown in FIG. 5 in simplified manner; its operatively effective range (heating zone) is indicated in FIG. 4 in dotted lines. The main conduit H of the melting vessel is in the form of an inclined channel (as described, for example, in German Patent No. 1,035,906) so that a liquid introduced thereinto at the elevated end will flow toward the lower end. The particular inclination of the main conduit to the horizontal is a matter of experience depending respectively upon how quickly the molten material is desired to be moved through the main channel or the degree of purification desired. In the interest of thorough purification, the corresponding channel will therefore preferably extend along an incline of only a few degrees to the horizontal.

From the main conduit or channel H of the melting vessel extend to one side thereof a number of branch or lateral channels K1–K4. The number of lateral channels and the spacing therebetween and if desired inclination thereof depend likewise upon the purification effect to be achieved and also upon the length of the main channel or conduit. The entire system of channels or conduits can be formed by quartz troughs or tubes or can be cut into a block of suitable heat resistant material. It is of course understood that the melting vessel—in the present case the conduits of the main channel and the branch channels—is made of, or lined with, a material adapted to contaminate the material to be purified as little as possible. For example, quartz coated respectively with pure graphite or pure carbon or pure magnesium, will be satisfactory for treating germanium.

The germanium to be purified is supplied at the elevated end O of the main conduit or channel, a supply container V being provided for continuous feed of the material. The purified material leaves the main channel H at the lower end U for discharge into a suitable receptacle. Suitable means (not shown) may be provided for blocking the outlet or discharge U and if desired also for blocking the feed inlet O. In the illustrated embodiment, the melting zone Z1 is drawn from the lower end to the elevated end of the inclined main conduit of the melting vessel. The lateral branch channels K1 to K4 terminate in a common trench or channel G for collecting the material flowing thereinto which is enriched with contaminations.

The discharge U is initially blocked and the vessel is filled with molten germanium which is permitted to solidify. However, the vessel may also be supplied with powdered germanium which is prior to the purified treatment sintered together by brief heating.

The molten zone Z1 moving with respect to the main channel H as well as the individual zones Z2 moving with respect to the lateral channels K1–K4 are advantageously produced by a single, for example, by a line-like heating source Q. The operation will be readily apparent from FIGS. 4 and 5. The heating source operates first in known manner so as to melt the material in the main conduit or channel H along a zone Z1 of desired length, which subdivides the solid material in the main channel H into two completely separated regions. The two molten zones Z1 and Z2 are produced by means of the single heat source Q owing to the fact that the operatively effective range for the zone-wise melting of the material (heating zone), produced by the heat source Q for producing the molten zone Z1 in the main channel, extends at least upon passing a branching-off area, laterally into the corresponding communicating channel K, thus being operative to effect melting of the material contained in the branch channel K, at least within the region contiguous to the branching-off area, thereby forming the molten zone Z2. The heat source Q is moreover so oriented with respect to the axes of the main conduit H and those of the parallel disposed branch channels K1–K4, that the preferably linearly shaped front of the melting zone extends during the continuous translation of the heat source Q, which is in known manner effected without rotation, obliquely to the axis of the main conduit as well as to the axes of the lateral branch channels; accordingly, the molten zone Z1 in the main conduit will upon passing a branching-off area split into a zone moving further in the main conduit and a molten zone moving in the corresponding branch channel. The lateral expansion of the operatively effective range of the heat source for producing the molten zones Z1 and Z2 must be such that the molten zones in the lateral branch channels reach the ends of the respective branch channels.

The motion of the heat source Q producing molten zones is to be guided so that the molten zone Z1 moves from the bottom towards the top, thus, in case of materials which expand upon solidifying, beginning at the lowest point or level. When the unblocked discharge U is within the operatively effective range of the heat source Q, the germanium in the vicinity of the discharge or outlet will flow off. Upon slowly moving the operatively effective range of the heat source upwardly, the material at the discharge will cool and the solidifying germanium will clog the discharge. Since the nearly molten germanium at the end of the upwardly moving heat source trickles in the direction of the discharge, there will be formed a molten zone between the purified and the unpurified material which, however, due to the inclination of the main conduit need not be directly in contact with the material not yet melted. It will however be apparent that this molten zone will act with respect to the purifying effect, etc., in the same manner as a molten zone which is directly in contact with solid material at the front, since the recrystallization zone acts entirely normally. The splitting of the molten zone in the main conduit at a branching-off area remains thereby likewise unaffected.

When the operatively effective range of the heat source Q (that is, the heating zone) has passed one of the lateral branch areas, a second molten zone will move in the corresponding branch channel to the right. Since such zone has taken over contaminations from the main zone Z1, there is obtained the previously explained increased purification effect in the material of the main conduit. The germanium is slowly transported to the ends of the branch channels provided that these channels extend horizontally or slightly inclined downwardly and, accordingly, strongly contaminated germanium will flow from these channels. It is advisable to form the branch channels so as to taper at the outflow ends thereof (but not at the ends adjacent the main conduit), as is particularly apparent from FIG. 4, so as to prevent too much germanium flowing out of the branch channels. The germanium flowing off is continuously replaced by fresh germanium from the supply container V, a large part of which passes during the purification along the main conduit to appear in purified condition at the discharge U, a smaller part thereof reaching the branch channels and leaving such channels in strongly contaminated condition.

As already shown in connection with considerations presented before, to convey basic understanding of the operation of the invention, the greatest purification effect is as compared with the normal zone melting method at any rate secured incident to the first passage of the molten zone through the material contained in the melting vessel. In order to assure that the advantage, additionally achieved by the use of the branching-off areas, remains particularly great upon repeating the process, the material crystallizing in back of the molten zones Z2 moving in the branch channels is not separated with a higher contamination degree, at least in a spacing corresponding to the length of the zone Z2, than that of the germanium crystallizing in back of the molten zone Z1 in the region of the branching-off area. This is with certainty achieved with a ratio of the recrystallization front F2 in back of the molten zone Z2 to the volume V2 which is smaller than the ratio of the recrystallization front F1 in back of the molten zone Z1 to its volume V1. This can be without any difficulties obtained by suitable matching of the ratios of the conduit cross sections as well as by corresponding inclination of the recrystallization surfaces and also the heating zone, with respect to the axes of the main conduit and those of the branch channels.

It is of course obvious that the same purification effect can be achieved by the use of independent heat sources for producing the molten zones Z1 and Z2. One of these heat sources is in such case guided alongside the main conduit H to produce the upwardly or downwardly moving melting zone Z1; the melting zones Z2 are respectively produced each by a separate heat source respectively associated with the individual branch channels K. While not being necessary, it is in such case advantageous to have the zones Z2 positioned at the branching-off areas at the instant when the molten zone Z1 passes the corresponding areas. It is, of course, also possible to operate simultaneously with a plurality of pairs of molten zones Z1 and Z2, as is diagrammatically indicated in FIG. 6. The arrangement shown in FIG. 6 operates with four heat sources, the operatively effective ranges W1 to W4 extending over the main conduit and also over the branch channels.

A similarly effective arrangement operating in the nature of a reversal of the process is obtained by moving a plurality of solidified zones through the material which is otherwise in fluid or liquid condition. The practical realization may be explained with reference to FIG. 6. The semiconductor material contained in the slightly inclined or plane system of the main conduit and the branch channels is melted, for example, by electric current flowing through the troughs of the main conduit made of conductive material and through the branch channels. Instead of the heating source Q, "frigid sources" are moved in suitably dimensioned spacing over the molten material. They produce in the solidified zones which become liquid again after they have left the operatively effective range of the "frigid source" the purification effect. The molten zone lying between two neighboring solidified zones then effects the purification in the manner already described. The "frigid sources" may, for example, be suitably shaped nozzles emitting currents of refrigerated inert gas.

One particular example shall be mentioned which is among the many other possible modifications of the method according to the invention. It is to be noted that there is the possibility to dispose several of the described melting vessels in series relationship. This may be accomplished by connecting at least two melting vessels each provided with a main conduit and branch channels serially in such a manner that the contaminations from the molten zones Z2 of the branch channels of the first melting vessel reach at different areas the main conduit of the second melting vessel, such that the branch channels of the first melting vessel terminate the farther from the discharge area of the main conduit of the serially successive melting vessel, the more contaminated the material is that is conveyed thereby. It will be immediately clear that the material in a branch channel is the more contaminated the nearer the channel is to the feed point of the first main conduit, that is, the nearer it lies in the conveying direction to the end of the molten zone Z1 of the main conduit.

An embodiment is shown in FIG. 7. The channel or conduit system consists of the main conduits H1 and H2 which are interconnected by the branch channels K1, K2, K3, while the other branch channels K4, K5, K6 extend from the second main conduit, from which the contaminated material is discharged. The heating zone produced by a heating source, outlined in dotted lines, while the melting zones Z1 and Z2 are shown stippled, is drawn through the channel system and produces molten zones which are respectively moved along the main conduits and along the branch channels so as to produce the described purification effect. From the lower ends of the two main conduits H1 and H2 is discharged purified material while contaminated material is discharged at the ends of the branch channels K4–K6.

Figure 8:
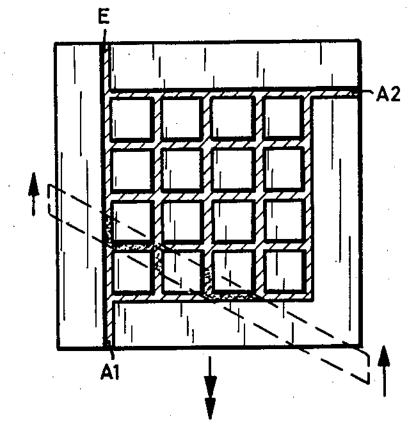

Another embodiment is illustrated in FIG. 8. The system of conduits and channels forms a quadratic structure over which the heating zone (indicated in dotted lines) is moved in the direction of the arrows. The material to be purified is introduced to the conduit at E and the purified material is discharged at A1. The structure is slightly inclined in the direction from E to A1 so that E is elevated with respect to A1. The structure extends in lateral direction or perpendicular to the conduit E–A1 horizontally or at an incline less than the incline in the direction E–A1. The strongly contaminated germanium is discharged at A2.

No particular problems are involved in the case of arrangements employing different heating sources for respectively producing the melting zones in the main conduit and in the branch channels. Explanations will however be made concerning various embodiments of the single heat source Q which is operative to produce the molten zones in the main conduit and also those in the branch channel or channels. As will be apparent from previous explanations, the heat source must in such a case be one with an operatively effective range of considerable extent so as to affect upon motion thereof parallel to the main conduit also the branch channels in the described manner. Various means, such as heat radiation sources, electron, or other corpuscular radiation, are known for producing molten zones in connection with customary zone melting. These means can without difficulties be constructed so as to meet the requirements of the invention. For example, a glowing heating wire or heating ribbon, supplying the proper temperature, may be arranged for motion relative to the system of conduits and channels, thereby producing the desired zones in the main conduit and in the branch channels, respectively.

Another embodiment may be noted, namely, one in which the required apparatus comprises a temperature resistant block composed of alternately conductive and insulating strips or layers, with cutouts formed therein to form the system including the main conduit H and the branch channels K, the strips or layers of the block extending with respect to the conduit-channel system so that the walls of the main conduit and those of the branch channels—which if desired may be provided with protective coating—consist of alternate conductive and nonconductive portions which determine the direction of the respective molten zones and which extend obliquely to the axis of the main conduit and also to the axes of the branch channels. In a modification, the main conduit H and the branch channels K may be formed by grooves cut into a temperature resistant block made of insulating material, such block being coated alternately with conductive and non-conductive strips which are relative to the conduit-channel system oriented so that they determine the direction of the molten zones, and which extend obliquely to the axes of the respective conduit and channels. Each of the conductive strips or layers is associated with an individual circuit which, when operatively connected, supplies current to heat the corresponding strip or layer to a temperature lying above the melting point of the material which is to be purified. A stepping mechanism is provided for closing the circuits of successfully disposed conductive strips corresponding to the length of the melting or heating zones to be affected, such stepping mechanism being also adapted to effect stepwise connection of the circuits of further conductive strips disposed at the front of a molten zone as well as corresponding disconnection of the circuits of conductive strips in back of the molten zone.

Figure 9:
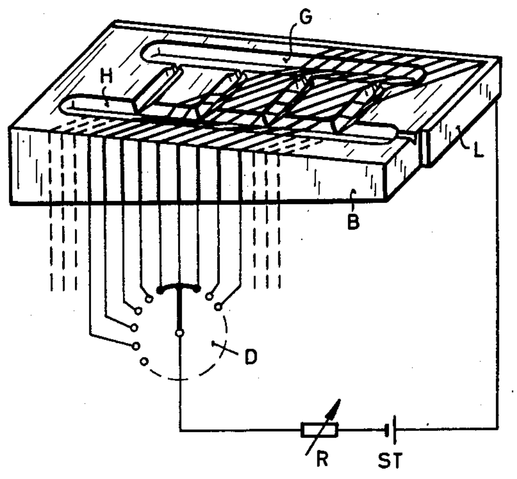

An example of an embodiment corresponding to the above described arrangement is shown in FIG. 9, in which the conduit-channel system is cut into a block made of graphite layers or strips (shown in black) alternating with aluminum oxide strips or layers (shown white). One end of each of the graphite strips is by way of a conductive bar L connected to one pole of a voltage source ST, the other pole being by way of a regulation resistor R connected with the wiper of a rotary stepping switch D. The other ends of the graphite strips are connected, each with a bank contact of the switch D such, that adjcent strips are connected with correspondingly adjacent bank contacts. The switch wiper thus connects in each position a series of adjacent conductive strips in the circuit of the voltage source ST while the remaining strips remain disconnected. Accordingly, upon rotating the wiper (by suitable not illustrated known drive means) at given speed successively over all bank contacts, a molten zone will be produced which moves through the material in the conduit-channel system from one to the other end thereof, thus producing the desired purification effect described before.

Figure 10:
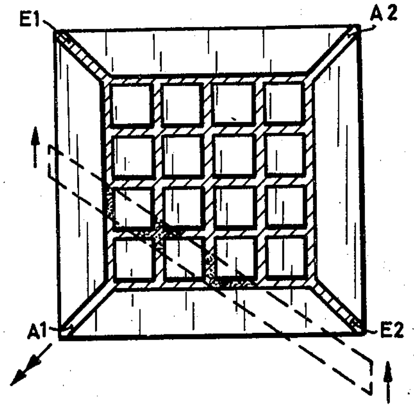
Figure 11:
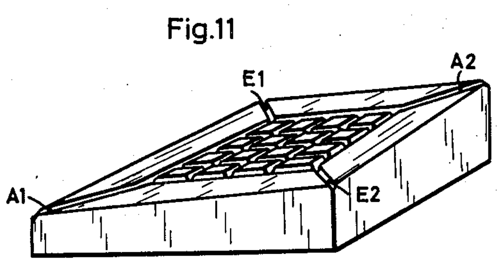

FIGS. 10 and 11 show an arrangement which is operated according to the principle explained in connection with FIG. 8. The structure is regarding the inlets and outlets or discharges more symmetrical than the one shown in FIG. 8, the two inlets E1 and E2 for the material to be purified being disposed at diagonally opposite corners, the discharge for the purified material being disposed at A1 and that for the contaminated material at A2. The structure is at an incline extending in the direction of the double arrow in FIG. 10, A2 being elevated with respect to A1. The heating zone, shown in FIG. 10 in dotted lines extends advantageously perpendicularly to the line of the incline. Owing to the expansion of the germanium upon solidification thereof, the material transport will be effected even in the presence of a slight incline of the structure.

Changes may be made within the scope and spirit of the appended claims which define what is believed to be new and desired to have protected by Letters Patent.

I claim:

1. In the art of purifying crystallizable semiconductor material by applying zone melting to such material contained in a main conduit and in at least one branch channel extending from and communicating with said main conduit at a point spaced from the starting point of said zone melting, said conduit and channel forming part of a purification vessel, a method of effecting said purification, comprising moving through the material contained in said main conduit and past the area at which said branch channel extends from said conduit a first melting zone which collects contaminants included in the material contained in said main conduit between the starting point of said melting zone and said branch channel, and moving a second melting zone through the material contained in said branch channel in a direction away from said area incident to the motion of said first melting zone past said area while preventing cross flow thereat, said first melting zone transferring the contaminants collected to said second melting zone, both melting zones leaving said area simultaneously.

2. A method according to claim 1, wherein said first melting zone forms incident to passing said area a continuous liquid mass with the liquid mass produced by said second melting zone, said continuous liquid mass, upon further motion of said first melting zone away from said area, separating again into the first melting zone and the second melting zone, respectively.

3. An arrangement for purifying crystallizable semiconductor material by applying zone melting thereto, comprising a purification vessel having means forming therein a main conduit and at least one branch channel extending from and communicating with said main conduit, material to be purified being disposed in said main conduit and in said branch channel, movable heat producing means for forming a first melting zone in the material disposed in said main conduit and a second melting zone in the material disposed in said branch channel, whereby said melting zones are moved through the respective material, said first melting zone moving past the area at which said branch channel extends from said main conduit and collecting contaminants included in the material disposed in said main conduit, and said second melting zone moving through the material disposed in said branch channel in a direction away from said area incident to the motion of said first melting zone past said area, said first melting zone transferring the contaminants collected to said second melting zone said movable heat producing means being so constructed that both melting zones leave said area simultaneously.

4. An arrangement according to claim 3, wherein said first melting zone forms incident to passing said area a continuous liquid mass with the liquid mass produced by said second zone, said continuous liquid mass, upon further motion of said first melting zone away from said area, separating again into the first melting zone and the second melting zone, respectively.

5. An arrangement according to claim 3, comprising a single heat source for producing the respective melting zones, the operatively effective range of the first melting zone extending at least incident to the motion thereof past said area into said branch channel causing melting of at least part of the material therein.

6. An arrangement according to claim 5, comprising means in said vessel forming a plurality of branch channels, wherein said heat source is oriented with respect to the axes of said main conduit and said branch channels so that the melt front extends with continuous translatory motion of said heat source at an incline to said axes, whereby the first melting zone upon moving past a branch area extends into the corresponding branch channel.

7. An arrangement according to claim 6, wherein said main conduit extends along an incline to the horizontal, comprising means forming an outlet at the elevated end of said conduit for feeding material thereto, and means at the lower end of said conduit forming a receptacle for receiving material discharged therefrom, the lateral extent of the operatively effective range of said heat source effecting motion of the melting zones in the respective branch channels to the ends of such channels.

8. An arrangement according to claim 7, wherein said main conduit extends at an incline to the horizontal, said first melting zone moving relative to said conduit in a direction from the lower end to the elevated end thereof.

9. An arangement according to claim 3, wherein the ratio of the recrystallization surface in back of the second melting zone to the volume thereof is at least at said branching area smaller than the ratio of the recrystallization surface in back of the second melting zone to the volume of the latter.

10. An arrangement according to claim 3, comprising means forming in serial relationship at least a first and a second main conduit each communicating with branch channels extending therefrom, the branch channels extending from the first main conduit terminating in the second main conduit and transporting collected contaminants thereinto, the branch channels extending from said first main conduit being increasingly spaced from the discharge end of the second main conduit according to the contaminations contained in the material disposed therein, said main conduit extending along an incline to the horizontal, at least one branch channel extending laterally from such inclined conduit perpendicular to the axis thereof, said branch conduits terminating in a common discharge formed therefor.

11. An arrangement according to claim 3, wherein said vessel is a heat resistant block composed of conductive strips alternating with insulating strips, said main conduit and said branch channels being cut into said block, the stratification of said strips extending with respect to said conduit and channels so that the walls thereof exhibit conductive strips alternating with non-conductive strips which determine the direction of the melting zones and which extend obliquely to the axes of said conduit and said channels, the walls of said conduit and of said channels being provided with protective coating.

12. An arrangement according to claim 11, comprising means forming for each conductive strip a circuit for conducting thereto a current which is effective to heat the corresponding strip to a temperature exceeding the melting point of the material to be purified, a stepping switch mechanism for successively closing the circuits of a plurality of conductive strips corresponding to the length of melting zones to be produced.

13. An arrangement according to claim 11, for treatment of germanium, wherein said conductive strips are made of graphite and wherein said insulating strips are made of aluminum oxide.

References Cited in the file of this patent

UNITED STATES PATENTS

| | | |
|---|---|---|
| 2,835,612 | Taylor | May 20, 1958 |
| 2,902,350 | Jenny et al. | Sept. 1, 1959 |
| 2,926,075 | Pfann | Feb. 23, 1960 |

OTHER REFERENCES

Zone Metling; Pfann, John Wiley & Sons, N.Y., 1958, relied on pages 139–141.